United States Patent [19]

Dvorkis et al.

[11] Patent Number: 5,373,148

[45] Date of Patent: Dec. 13, 1994

[54] OPTICAL SCANNERS WITH SCAN MOTION DAMPING AND ORIENTATION OF ASTIGMANTIC LASER GENERATOR TO OPTIMIZE READING OF TWO-DIMENSIONALLY CODED INDICIA

[75] Inventors: Paul Dvorkis, Stony Brook, N.Y.; Emanuel Marom, Tel Aviv, Israel; Boris Metlitsky, Stony Brook; Howard Shepard, Great River, both of N.Y.

[73] Assignee: Symbol Technologies, Inc., Bohemia, N.Y.

[21] Appl. No.: 943,232

[22] Filed: Sep. 10, 1992

Related U.S. Application Data

[63] Continuation-in-part of Ser. No. 789,705, Nov. 8, 1991, which is a continuation-in-part of Ser. No. 520,464, May 8, 1990, Pat. No. 5,168,149, which is a continuation-in-part of Ser. No. 428,770, Oct. 30, 1989, Pat. No. 5,099,110.

[51] Int. Cl.$^5$ ............................................... G06K 7/10
[52] U.S. Cl. ............................................... 235/472; 235/462; 359/198; 359/202; 348/205
[58] Field of Search ............................................. 359/198, 199, 217; 348/205; 358/208; 235/462, 472; H04N 3/08

[56] References Cited

U.S. PATENT DOCUMENTS

| | | |
|---|---|---|
| 1,202,446 | 10/1916 | Speed . |
| 1,552,186 | 9/1925 | Anderson . |
| 1,800,601 | 4/1931 | Centeno . |
| 1,873,926 | 8/1932 | Centeno . |
| 2,971,054 | 2/1961 | Holt, Jr. . |
| 2,989,643 | 6/1961 | Scanlon . |
| 3,087,373 | 4/1963 | Poor et al. . |
| 3,532,408 | 10/1970 | Dostal . |
| 3,642,343 | 2/1972 | Tchejeyan et al. . |
| 3,981,556 | 9/1976 | Sabatelli et al. . |
| 3,981,566 | 9/1976 | Frank et al. . |
| 3,998,092 | 12/1976 | Maccabee . |
| 4,021,096 | 5/1977 | Dragt . |

(List continued on next page.)

FOREIGN PATENT DOCUMENTS

| | | | |
|---|---|---|---|
| 471291(A2) | 7/1991 | European Pat. Off. . | |
| 265221 | 10/1989 | Japan | 359/198 |
| 471291 | 2/1992 | Japan | 359/202 |
| 145410 | 5/1992 | Japan | 359/198 |
| 2175705 | 12/1986 | United Kingdom . | |

OTHER PUBLICATIONS

Reich, "The Use of Electro-Mechanical Mirror Scanning Devices", SPIE, vol. 85, Laser Scanning components & Techniques, pp. 47–55 (1976).
IBM Technical Disclosure Bulletin, W. L. Grabowksi and R. J. Wohl, vol. 8, No. 5, Oct. 1962, p. 78.

*Primary Examiner*—John Shepperd

[57] ABSTRACT

In an optical scanner, a component for producing a beam scanning motion is mounted on a first flexible strip or planar spring. One or more additional flexible strips, adjacent the first flexible strip, provide additional support to prevent droop by the first flexible strip under the weight of the scanning component. The additional flexible strips also frictionally damp the low frequency motion of the first flexible strip to prevent interference with scanning due to vibration induced from movement of the scanner by an operator. In two-dimensional scanners, where the component moves in two orthogonal directions at two different speeds, the additional strip type frictional damping is applied to the planar spring which provides the necessary flexible support for motion in the slow speed scanning direction. Also, two-dimensional scanners conforming to the present invention use a gain-guided visible laser diode oriented in a particular manner so that the astigmatism of the laser beam extends the working range by compensating for decreasing fast direction scan line density at points farther away from the scanner.

33 Claims, 8 Drawing Sheets

U.S. PATENT DOCUMENTS

| | | |
|---|---|---|
| 4,175,832 | 11/1979 | Umeki et al. . |
| 4,199,219 | 4/1980 | Suzuki et al. . |
| 4,251,798 | 2/1981 | Swartz et al. . |
| 4,256,364 | 3/1981 | Minoura et al. . |
| 4,369,361 | 1/1983 | Swartz et al. ............... 235/470 |
| 4,387,297 | 6/1983 | Swartz et al. ............... 235/462 |
| 4,409,470 | 10/1983 | Shepard et al. ............. 235/472 |
| 4,496,831 | 1/1985 | Swartz et al. ............... 235/472 |
| 4,593,186 | 6/1986 | Swartz et al. ............... 235/472 |
| 4,632,501 | 12/1986 | Glynn . |
| 4,705,365 | 11/1987 | Wakita et al. . |
| 4,732,440 | 3/1988 | Gadhok . |
| 4,760,248 | 7/1988 | Swartz et al. ............... 235/472 |
| 4,808,804 | 2/1989 | Krichever et al. ........... 235/470 |
| 4,816,660 | 3/1989 | Swartz et al. ............... 235/472 |
| 4,816,661 | 3/1989 | Kirchever et al. ........... 235/472 |
| 4,871,904 | 10/1989 | Metlitsky et al. ............ 235/467 |
| 4,902,083 | 2/1990 | Wells . |
| 4,919,500 | 4/1990 | Paulsen . |
| 4,923,281 | 5/1990 | Krichever et al. . |
| 4,958,894 | 9/1990 | Khowler ....................... 359/213 |
| 4,962,980 | 10/1990 | Knowles ....................... 235/467 |
| 4,974,918 | 12/1990 | Delache et al. . |
| 5,015,831 | 5/1991 | Eastman et al. ............. 235/470 |
| 5,099,110 | 3/1992 | Shepard et al. ............. 235/472 |
| 5,168,149 | 12/1992 | Dvorkis et al. .............. 235/472 |

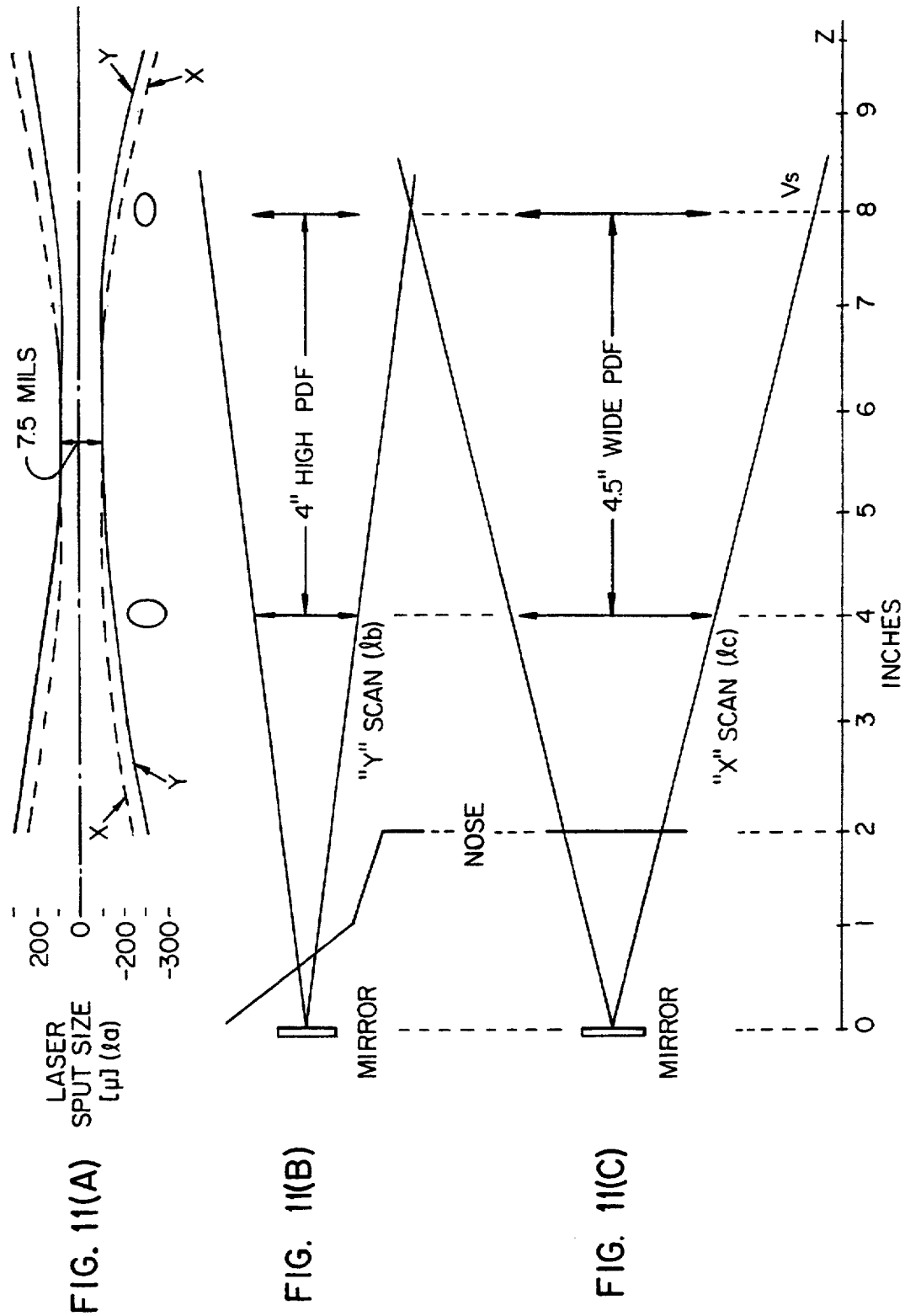

OPTICAL SCANNERS WITH SCAN MOTION DAMPING AND ORIENTATION OF ASTIGMANTIC LASER GENERATOR TO OPTIMIZE READING OF TWO-DIMENSIONALLY CODED INDICIA

CROSS-REFERENCE TO RELATED APPLICATIONS

This application is a continuation-in-part of copending application Ser. No. 789,705 filed on Nov. 8, 1991, which is a continuation-in-part of application Ser. No. 520,464 filed on May 8, 1990, now U.S. Pat. No. 5,168,149, which is a continuation-in-part of application Ser. No. 428,770 filed on Oct. 30, 1989 which issued as U.S. Pat. No. 5,099,110. Each of the above identified applications is incorporated herein by reference.

TECHNICAL FIELD

This invention relates to optical scanning devices, such as bar code scanners, and more particularly to improved laser scanning modules for use in such devices capable of scanning two-dimensional or multi-line type bar codes.

BACKGROUND

Optical readers, such as bar code readers, are now quite common. Typically, a bar code comprises a series of encoded symbols, and each symbol consists of a series of light and dark regions, typically in the form of rectangles. The widths of the dark regions, the bars, and/or the widths of the light spaces between the bars indicate the encoded information.

A bar code reader illuminates the code and senses light reflected from the code to detect the widths and spacings of the code symbols and derive the encoded data. Bar code reading type data input systems improve the efficiency and accuracy of data input for a wide variety of applications. The ease of data input in such systems facilitates more frequent and detailed data input, for example to provide efficient inventories, tracking of work in progress, etc.

A variety of scanning devices are known. One particularly advantageous type of reader is an optical scanner which scans a beam of light, such as a laser beam, across the symbols. Laser scanner systems and components of the type exemplified by U.S. Pat. Nos. 4,387,297 and 4,760,248—which are owned by the assignee of the instant invention and are incorporated by reference herein—have generally been designed to read indicia having parts of different light reflectivity, e.g., bar code symbols, particularly of the Universal Product Code (UPC) type, at a certain working range or reading distance from a hand-held or stationary scanner.

FIG. 1 illustrates an example of a prior art bar code reader unit 10 implemented as a gun shaped device, having a pistol-grip type of handle 53. A lightweight plastic housing 55 contains the laser light source 46, the detector 58, the optics and signal processing circuitry and the CPU 40, as well as a power source or battery 62. A light-transmissive window 56 in the front end of the housing 55 allows the outgoing light beam 51 to exit and the incoming reflected light 52 to enter. The reader 10 is designed to be aimed at a bar code symbol 70 by the user from a position in which the reader 10 is spaced from the symbol, i.e., not touching the symbol or moving across the symbol.

As further depicted in FIG. 1, a suitable lens 57 (or multiple lens system) may be used to focus the scanned beam into a scanning spot at an appropriate reference plane. A light source 46, such as a semiconductor laser diode, introduces a light beam into the axis of the lens 57, and the beam passes through a partially-silvered mirror 47 and other lenses or beam-shaping structure as needed. The beam is reflected from an oscillating mirror 59 which is coupled to a scanning motor 60 energized when the trigger 54 is pulled. The oscillation of the mirror 59 causes the reflected beam 51 to scan back and forth in a desired pattern.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternate circumferential directions about a drive shaft on which the multi-mirror construction is mounted.

The light 52 reflected back by the symbol 70 passes back through the window 56 for application to the detector 58. In the exemplary reader 10 shown in FIG. 1, the reflected light reflects off of mirror 59 and partially-silvered mirror 47 and impacts on the light sensitive detector 58. The detector 58 produces an analog signal proportional to the intensity of the reflected light 52.

A digitizer circuit mounted on board 61 processes the analog signal from detector 58 to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The pulse signal from the digitizer is applied to a decoder, typically a programmed microprocessor 40. Typically, the microprocessor decoder 40 will have associated program memory and random access data memory. The decoder first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard the scanned symbol conforms to. This recognition of the standard is typically referred to as autodiscrimination.

To scan a symbol 70, a user aims the bar code reader unit 10 and operates movable trigger switch 54 to activate the light beam 51, the scanning motor 60 and the detector circuitry. If the scanning beam is visible, the operator can see the scan pattern on the surface on which the symbol appears and adjust aiming of the reader 10 accordingly. If the light produced by the source 46 is marginally visible, an aiming light may be included in the optical system. The aiming light if needed, produces a visible-light spot which may be fixed, or scanned just like the laser beam; the user employs this visible light to aim the reader unit at the symbol before pulling the trigger.

The reader 10 may also function as a portable computer terminal. If so, the bar code reader 10 would include a keyboard 48 and a display 49, such as described in the previously noted U.S. Pat. No. 4,409,470.

In many of the prior art scanners of the type generally discussed above, flexible support means are provided to support one or more of the optical components for reciprocal motion. Although such support structure is not shown separately in FIG. 1, typically the flexible support would support the mirror 59 to permit angular oscillatory motion thereof in response to activation of scanning motor 60. As the size of the scanner is reduced to reduce weight and make prolonged operation more comfortable and convenient, manufacturers have tried to decrease the size of the mirror and its support structure. Many flexible support structures formed of flat strip materials, however, have lacked sufficient physical strength to support the mirror. As a result, the mirror tends to droop in a manner which disrupts the optical alignment of the mirror with the laser source 46.

Also, in some scanning applications it is desirable to scan at extremely low frequencies, for example at or below 20 Hz. This is particularly true in devices which optically scan in two different directions to scan an indicia which includes two or more lines of optically encoded information. To read such two-dimensional codes, a first direction (e.g. an X-direction) is scanned at a relatively high rate, while the second direction (e.g. Y-direction) is scanned at the low rate. This produces a raster or similar two-dimensional scanning pattern having a relatively high density of the X-direction scan lines. Flexible support structures for movement of mirrors or other optical components at such low rates, however, are susceptible to low frequency jitter caused by movement of the hand in which the operator holds the scanner. Hand motion typically induces a noise vibration on the order of 2 Hz to 10 Hz, and such a vibration will cause a vibration of the low speed scanning support mechanism and disrupt the scanning pattern.

Another problem with prior art scanners relates to working range, particularly that of scanners designed to read two-dimensional symbologies. The working range is defined as the region within which the scanning pattern is sufficient to permit accurate decoding as the beam pattern passes across the bar code symbol. A two-dimensional scanning pattern has a finite number of lines in the first (X) direction. When the scanner is close to the scanned surface, the scanning pattern is small, and the lines are close together (high line density). If the operator moves the scanner further away, however, the scan pattern enlarges, and the lines are further apart (lowering line density). Consequently, as the distance between the scanner and the symbol moves out of the working range of the scanner, which is typically only a few inches in length, the density of the scan lines in the two dimensional pattern drops so low that it prevents accurate reading of the two-dimensional bar code. Present two-dimensional scanning systems, accordingly, must be positioned within a relatively narrow range of distances from a symbol in order to properly read the symbol, which may make operation inconvenient and difficult.

DISCLOSURE OF THE INVENTION

Objectives

An objective of the present invention is to reduce the droop of flexible supporting structures used in optical scanning systems to movably support scanning components.

Another objective of the present invention is to provide a flexible support structure capable of low frequency scanning oscillation which is not susceptible to low frequency noise vibration, such as caused by hand motions of an operator holding an optical scanner.

Other objectives relate specifically to improving performance of scanners arranged to produce a scanning pattern in two different directions, for reading an indicia which includes two or more lines of optically encoded information.

In a scanner having means to produce scanning motion in a first direction at a relatively high frequency and means to produce scanning motion in a second direction at a relatively low frequency, one specific objective is to eliminate low frequency vibrations which would disrupt operation of the means to produce scanning in the second direction.

Another specific objective is to extend the working range of two-dimensional optical scanners.

SUMMARY

To achieve the above stated objectives, the present invention provides one or more additional flexible strips, adjacent a first flexible strip or planar spring which actually supports the scanning component. These additional strips provide support to prevent droop by the first flexible strip under the weight of the scanning component and dampen the low frequency motion of the first flexible strip to prevent interference with scanning which might be caused by vibration induced from movement of the scanner by an operator. Also two-dimensional scanners conforming to the present invention use a gain-guided visible laser diode oriented so that the beam astigmatism compensates for decreasing fast direction scan line density at points farther away form the scanner.

In one aspect, the invention comprises an optical scanning system for reading optically encoded indicia having portions of differing light reflectivity. The system includes components for emitting a beam of light and optically directing the beam of light toward the optically encoded indicia, and a detector for receiving light reflected back from the optically encoded indicia and producing electrical signals corresponding to the differing light reflectivity of the indicia. A first flexible strip, often referred to as a "planar spring," has one fixed end and an opposite end which is free to move upon flexing of the planar spring. Means, such as a permanent magnet and an electromagnet, are provided to produce a reciprocal flexing of the planar spring such that the free end thereof vibrates. One of the emitting and optics components reciprocates with the free end of the planar spring. As a result, the light beam scans across the optically encoded indicia during the reciprocal flexing motion of the planar spring type first flexible strip. The system also includes a second flexible strip having a fixed end and a free end, and engagement means for engaging a portion of the second flexible strip at or near the free end thereof during flexing of the planar spring. The second flexible strip provides support for the first flexible strip and/or dampens the reciprocal flexing motion of the first flexible strip.

In another aspect, a system such as discussed above is adapted for two-dimensional scanning. This second system provides mountings for the optical component to produce oscillating movement of the beam of light in a first direction at a first oscillating frequency and in a second direction at a second oscillating frequency lower than the first oscillating frequency. The first flexible strip or "planar spring" provides the necessary flexible support of the component for producing the beam motion in the second direction. Typically, the planar spring will also support the means for mounting the component for vibration to produce the scanning in the first direction. As a result, the mass carried by the planar spring is high and the oscillation frequency thereof is quite low. The additional support and damping provided by the second flexible strip thus greatly improve the performance and durability of such a two-dimensional scanner.

Typically, the invention uses two additional flexible strips. Flexible plastic materials may form the first and second flexible strips, for example Mylar ™ or Kapton ™. The invention also encompasses a number of different forms of engagement of the additional flexible strips. For example, the flat surfaces of the second flexible strips may frictionally engage surfaces of the planar spring. Alternatively, extensions mounted for movement with the free end of the first planar spring engage a portion of a surface of each additional flexible strip at points at or near the free end thereof. The extensions each may curve to a polished end surface which directly engages the surface of the corresponding additional flexible strip, or the ends of the extensions may carry plastic cylinders for contact with the flexible strips.

In other aspects, the invention provides a method and a system for scanning two-dimensional indicia using a specifically oriented laser beam. Typically, this aspect of the invention uses a gain-guided visible laser diode. The beam from such a device has an astigmatism. At points relatively close to the diode chip a cross-sectional width of the beam in a dimension parallel to the plane of the diode chip is smaller than a cross-sectional height of the beam in a dimension perpendicular to the plane of the diode chip. At points far from the diode chip, however, the cross-sectional width of the beam is larger than the cross-sectional height of the beam. In two dimensional scanning, the laser beam is oscillated such that the cross-sectional width of the beam moves across the indicia in a first direction substantially corresponding to the direction of the lines of the indicia. Typically, this direction is also the fast scan direction. This orientation of the gain guided laser diode compensates for the lower density of scan lines when the scanner is further away from the encoded indicia. As a result, the effective working range of the two-dimensional scanner is extended to points further from the nose of the scanner.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIGS. 11(A) to 11(C) are a series of graphs illustrating the effects of the astigmatism of a gain guided visible laser diode and two-dimensional scanning of an indicia.

BEST MODES FOR CARRYING OUT THE INVENTION

As used in this specification and in the appended claims, the term "indicia" broadly encompasses not only symbol patterns composed of alternating bars and spaces of various widths commonly referred to as bar code symbols, but also other one or two dimensional graphic patterns, as well as alphanumeric characters. In general, the term "indicia" may apply to any type of pattern or information which may be recognized or identified by scanning a light beam and detecting reflected or scattered light as a representation of variations in light reflectivity at various points of the pattern or information. A bar code symbol is one example of an "indicia" which the present invention can scan.

General Description of Two Dimensional Scanner

Figure 2:
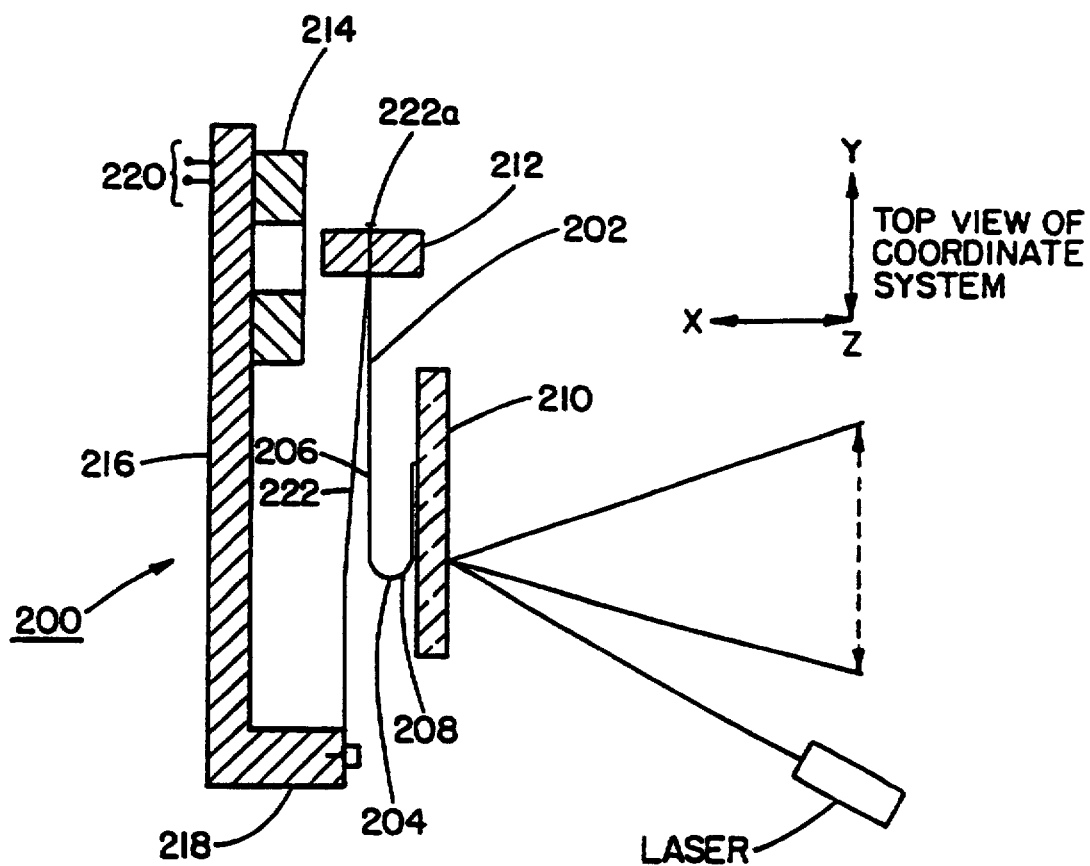
FIG. 2 is a cross-sectional view providing a simplified illustration of a two-dimensional scanning arrangement used in the present invention.

FIG. 2 of the drawings illustrates a typical scanning arrangement 200 for the implementation of a two-dimensional or two-axis scan pattern. As shown, a holder 202 incorporates a U-shaped spring 204 having a pair of arms 206 and 208. A scanning component, for example a light reflector or mirror 210, is fixedly mounted at the free end of the arm 208. A permanent magnet 212 is attached to the opposite end of the holder 202, i.e. at the end of arm 206. An upright member 216, secured to a base 218, supports an electromagnet 214 in close proximity to the permanent magnet 212. Electrical input leads 220 carry an energizing current or drive signal to the coil of electromagnet 214.

The arm 206 and the permanent magnet 212 are secured to a generally planar spring member 222 at one end 222a thereof. The other end of the planar spring member 222 is secured to the base 218 by a suitable fastener. The mass of the mirror 210 may be equal to the mass of the permanent magnet 212, or in some cases the mass of the mirror may be much higher than the equivalent mass of the U-shaped spring 204.

The planar spring 222 may be made of any suitable flexible material, such as a leaf spring, a flexible metal foil or a flat bar. Preferred embodiments discussed below use a flat strip of plastic material, such as Mylar TM or Kapton TM, to form the planar spring. The holder comprising the U-shaped spring structure 204, 206, 208 may be constituted from any suitable resilient or flexible metallic material; such as a beryllium-copper alloy.

Figure 8:
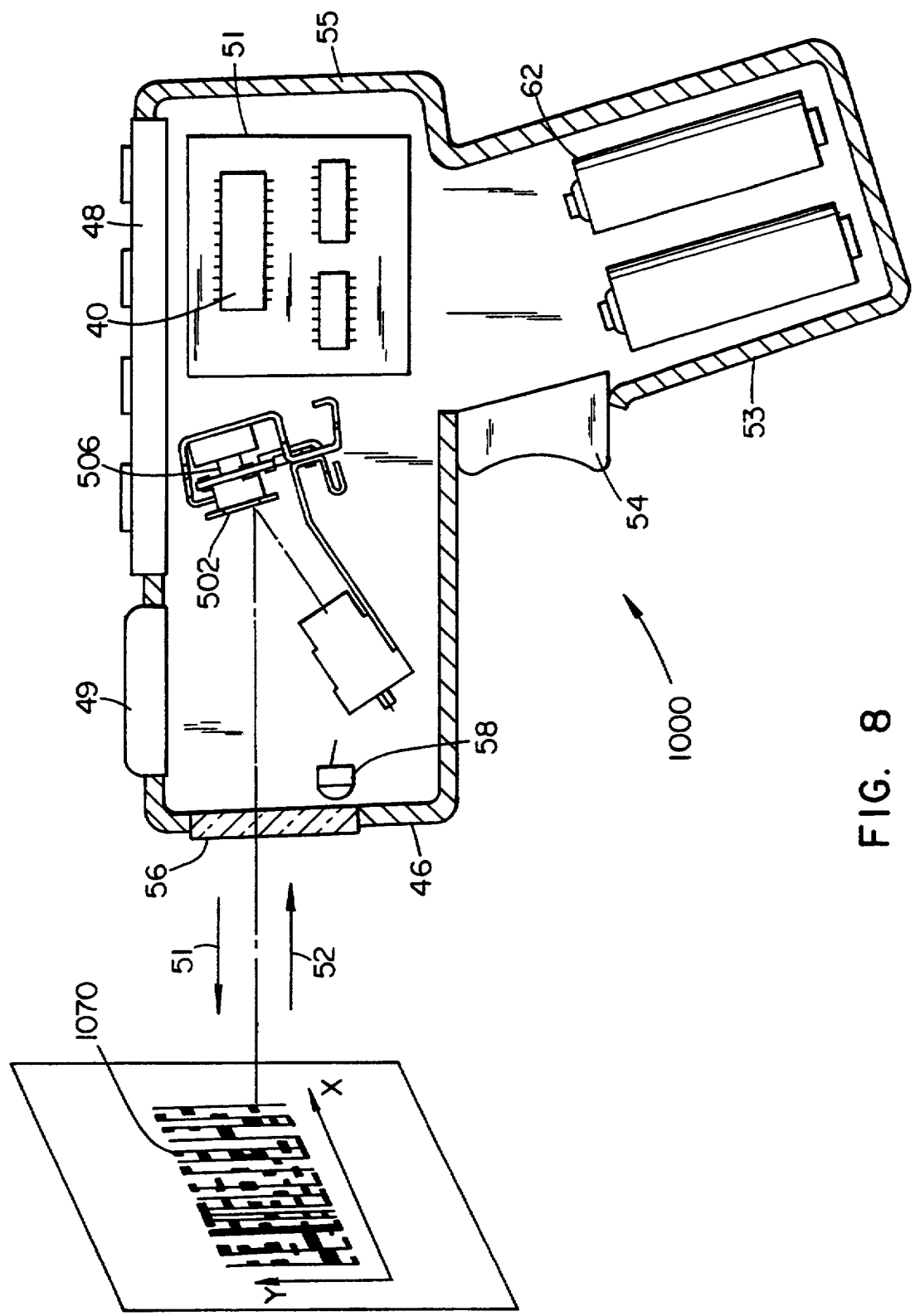
FIG. 8 is a cross-sectional illustration of a bar code reader unit, implemented as a gun shaped device, which includes the two-dimensional scanning module of FIG. 7.

As shown at 1070 in FIG. 8, a two dimensional bar code comprises a series of rows or lines of optically encoded information. If the rows are oriented in the X-direction, shown substantially horizontal, the rows are located one above another in the Y-direction (vertical). Each row or line of information comprises a series of encoded symbols, and each symbol consists of a series of light and dark regions, typically in the form of rectangles. The widths of the dark regions, the bars, and/or the widths of the light spaces between the bars indicate the encoded information on row or line. To read a two-dimensional indicia, such as the code 1070, it is desirable to scan the indicia with a raster-type scan pattern or the like. In such a scan pattern, a series of substantially horizontal and substantially parallel scan lines traversed the indicia 1070 from an upper horizontal scanline, proceeding downwardly with a multiplicity of intermediate horizontal scan lines to a lower horizontal scan line to uniformly cover a desired scan area encompassing the indicia.

In order to obtain a raster-type scan pattern using the scanning arrangement 200 (FIG. 2), the U-shaped spring 204 and the planar spring 222 may be arranged to vibrate in planes which are orthogonal to each other. As shown in the drawing, the arms of the U-shaped spring 204 will vibrate in the X-Y plane and the planar spring 222 will vibrate in the X-Z plane. Through this arrangement of the holder structure 202, the mirror or scanner component 210 is mounted for angular oscillating movement, in first and second alternate circumferential directions, between first and second pairs of scan end positions.

The shape, dimensions and material are chosen to make the U-shaped spring 204 relatively stiff. Also, the mass which the U-shaped spring 204 must carry during the vibration thereof in the X-Y plane is relatively low (substantially equal to only the mass of the mirror 210). In contrast, the shape, dimensions and material of the planar spring 222 are chosen to make the spring 222 relatively flexible. Also, the mass which the planar spring 222 must carry during the vibration thereof in the X-Z plane is relatively high (substantially equal to the mass of the mirror 210 plus the mass of the magnet 212 and the U-shaped spring 204). As a result, the U-shaped spring 204 will vibrate in the X-Y plane in a high range of frequencies, typically in a range of 200 to 800 Hz, whereas the planar spring 222 will vibrate in the X-Z plane in a low range of frequencies, typically about 5 to 200 Hz.

The electromagnet 214 typically comprises a core or bobbin around which a coil is wound such that the core and coil are entirely concentric to minimize size and weight. The core may consist of any appropriate light weight material. When there is no current through the coil, the resilient nature of the U-shaped spring 204 and the planar spring 222 causes the mirror 210 to return to its rest position (essentially the position shown in FIG. 2). When a current is introduced through the coil, interaction between magnetic fields of the coil and the permanent magnet 212 creates a moment of force causing the magnet 212 (with the attached U-shaped spring 204, planar spring 222 and mirror 210) to move from an equilibrium position. This force moment moves the permanent magnet 212 either toward or away from the bobbin and coil. As a result of such motion, spring forces are produced by both the U-shaped spring 204 and the planar spring 222 which tend to bring the permanent magnet 212 and the mirror 210 back to their rest positions. Reversing the polarity of the applied current will reverse the directions of the magnetic force and the opposing spring forces. Therefore, if the current applied to the coil of the electromagnet 214 takes the form of a cyclical AC signal, such as a sign wave, a pulse signal, a triangular wave, etc., the resultant magnetic forces will produce an oscillatory movement of the permanent magnet 212 back and forth (left to right in the drawing).

The oscillatory forces applied to the single permanent magnet 212 by the electromagnet 214 can initiate the desired vibrations in both of the springs 204 and 222 by carefully selecting the drive signal applied to terminals 220 to drive the coil of the electromagnet 214. Specifically, the drive signal applied to the electromagnet comprises a superposition of two cyclical signals of different frequencies. The first signal component has a frequency within the high range of frequencies corresponding to the vibration frequency of the U-shaped spring 204. The second signal component has a frequency within the low range of frequencies corresponding to the vibration frequency of the planar spring 222. Thus the vibratory magnetic forces applied to the permanent magnet 212 will include the two different frequency components corresponding to the two component signals in the drive signal. Because of the different frequency vibration characteristics of the two springs 204 and 222, each spring will vibrate only at its natural vibration frequency. Thus when the electromagnet 214 is driven by such a superposition signal, the U-shaped spring 204 will vibrate at a frequency in the high range of frequencies, and the planar spring 222 will vibrate at a frequency in the low range of frequencies.

The angular amplitude of vibration necessary to scan the symbol will depend upon the size of the symbol and would typically be at least 10° to 30° optical. An increase in the angular amplitude by the scan line produced by the holder arrangement 202, which may be desirable for certain applications, may be readily attained by constructing the U-shaped spring 204 with the arms being asymmetrically dimensioned, i.e., of different lengths. Such a spring construction produces a resonant asymmetric scan element. Thus, in a specific embodiment, the arm 208 may be shorter than the arm 206 by a ratio of at least 2:1. Thus, an asymmetrically dimensioned U-shaped spring will result in a longer Y direction scan line in a raster-type pattern.

In addition to increasing the angular amplitude, which can be as much as a 100% increase over a symmetrically dimensioned U-shaped spring, an asymmetrically dimensioned U-shaped spring provides a higher durability against metal fatigue and cracking since the nodal point is no longer located at a curved portion of the spring. This type of construction also provides the benefit of less vibration being transferred to the base, since the U-shaped spring is held only at the magnet end and the angular movement of the magnet can be a plurality of times lower than that of the scanning component or mirror 210.

Preferred Embodiment of Two Dimensional Scanner

A preferred embodiment of the invention is illustrated in FIG. 3 to 8 of the drawings. In this embodiment, the scanning component is the mirror 502. The U-shaped spring supports the mirror 502 for rotational vibration about a vertical axis passing through the mirror to produce X-direction beam scanning motion, and a planar spring 522 flexes to permit vibration about a horizontal axis to produce Y-direction beam scanning motion.

The subassembly 500 employs the wide planar spring 522 for the low-frequency flexure. The spring 522 typically will consist of a flat sheet of flexible plastic material, such as Mylar TM or Kapton TM. The lower end of the planar spring 522 includes two or more holes through which fasteners (bolts, rivets, pins or the like) will be passed so that the lower end is the "fixed" end of the spring 522 when the sub-assembly 500 is incorporated into the scanning module 700 (see FIG. 7).

The free upper end of the planar spring 522 carries the permanent magnet 514, the U-shaped spring 504 and the mirror 502. More specifically, the upper end of the planar spring 522 is sandwiched between a front extension plate 517 and the lower end of an L-shaped bracket. The front extension plate 517 and the lower portion of the L-shaped bracket are held together by two fasteners (rivets or pins or the like). The side of the support plate 506 is then attached to the vertical portion of the L-shaped bracket by similar fasteners. A second extension 518 is attached to the lower portion of the L-shaped bracket or sandwiched between the planar spring and the bracket. In this embodiment, the extensions 517 and 518 typically are formed of a flexible metal, such as a beryllium-copper alloy. The extensions curve down and out away from the free end of the planar spring 522. The ends of the extensions 517, 518 have a polished end surface. The functions of the extensions 517 and 518 will be discussed in detail below.

Figure 3:
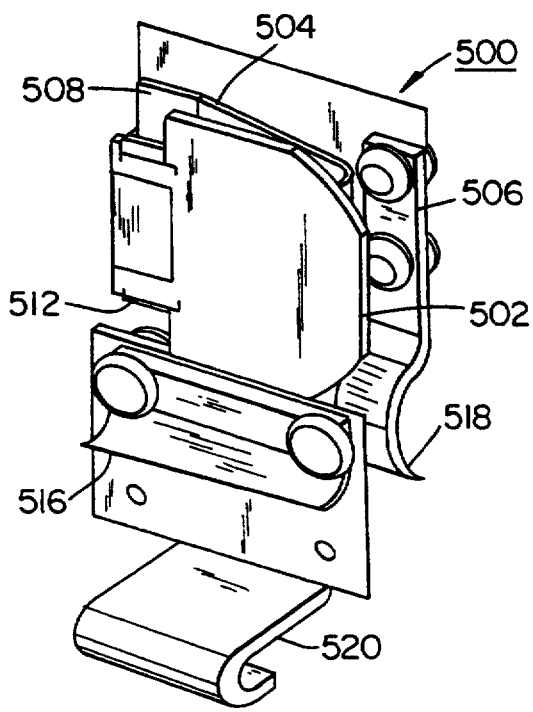
FIGS. 3 and 4 provide front and rear isometric views, respectively, of a sub-assembly of a preferred embodiment of a two-dimensional scanner in accord with the present invention.
Figure 4:
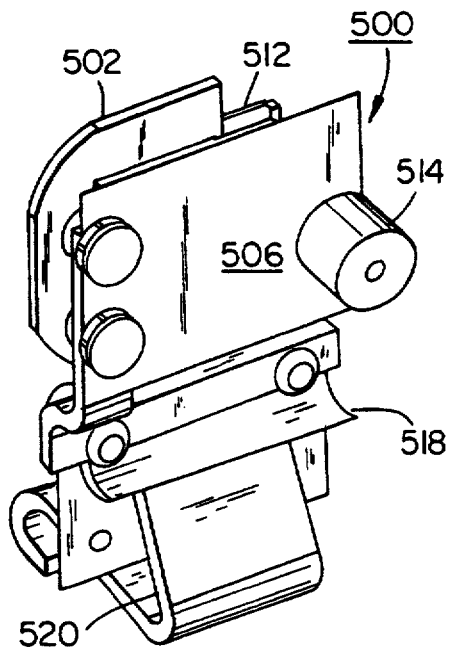

As shown in FIG. 4, the plate 506 carries the permanent magnet 514 mounted near the right side of the rear surface of the plate. The end of arm 508 of the U-shaped spring 504 is fastened to plate 506 (FIG. 6) at a point on the front surface thereof opposite to the position of the magnet 514 (compare FIGS. 3 and 4).

The subassembly 500 also includes a balance member 520 mounted for motion together with the support plate 506 and the components attached thereto. In the example shown in the drawings, the balance member 520 is attached to the rear of the lower horizontal arm of the L-shaped bracket through which the fasteners pass to attach the bracket and the support plate 506 to the upper end of the planar spring 522. Alternatively, the support plate 506, the L-shaped bracket and the balance member could be formed as a single integrated component.

The balance member 520 projects approximately from the lower end of plate 506 and passes below the lower end of the planar spring 522. The member 520 is dimensioned such that its mass substantially balances the mass of the mirror 502, the spring 504, the plate 506 and the magnet 514 with respect to the horizontal pivot axis about which the planar spring 522 flexes. The balance member also decreases the resonant frequency at which the planar spring 522 vibrates by increasing the total mass of the components which move during flexing of the planar spring. The end of the balance member 520 curves back to act as a stop, in a manner to be discussed later.

The balance member 520, the mirror 502, the spring 504, the extension plate 517, the plate 506 and the magnet 514 all move with the free end of the planar spring 522, when spring 522 flexes. Thus the mass vibrating when spring 522 vibrates is relatively high. Also, the material of the spring 522 is relatively flexible, e.g. Mylar TM or Kapton TM. Consequently, the planar spring 522 will vibrate at a characteristic frequency in a relatively low range of frequencies, such as within the range of about 5 to 15 Hz.

Figure 5:
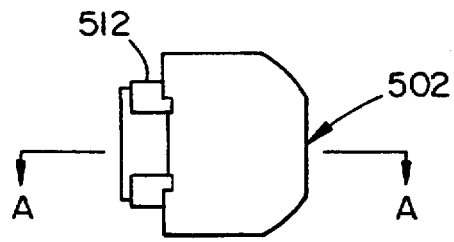
FIG. 5 is a front view of the mirror, U-shaped spring and support plate, taken from the sub-assembly illustrated in FIGS. 3 and 4.
Figure 6:
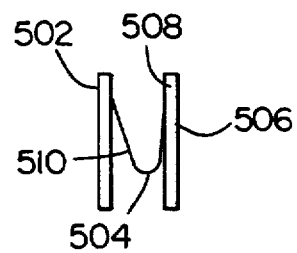
FIG. 6 is a sectional view of the mirror, U-shaped spring and support plate taken along line A—A in FIG. 5.

In contrast, the U-shaped spring carries only the mass of the mirror 502 is relatively stiff and vibrates at relatively high frequencies. In this embodiment the U-shaped spring 504 is rotated or angled by about 90° relative to the extent or axial length of the planar spring 522. The U-shaped spring may be beryllium-copper, or similar material as discussed above with regard to the spring 204 in FIG. 2. As shown in FIGS. 3 and 5, the mirror 502 has a reduced cross-sectional width at one end thereof to form a generally rectangular neck portion (left side in FIG. 5). Inwardly folded clip-like members or gripping arms 512 formed at opposite side edges of the U-shaped spring 504 clamp the rectangular neck portion of the mirror 502. To the right of the neck portion (FIG. 5) the mirror 502 widens considerably, both sideways and vertically, so as to provide a large surface for reflection during scanning. Thus, the mirror 502 and spring 504 are dimensioned such that the axis of rotation of the mirror with respect to vibrations of the spring 504 passes vertically through the enlarged portion of the mirror 502.

Figure 7:
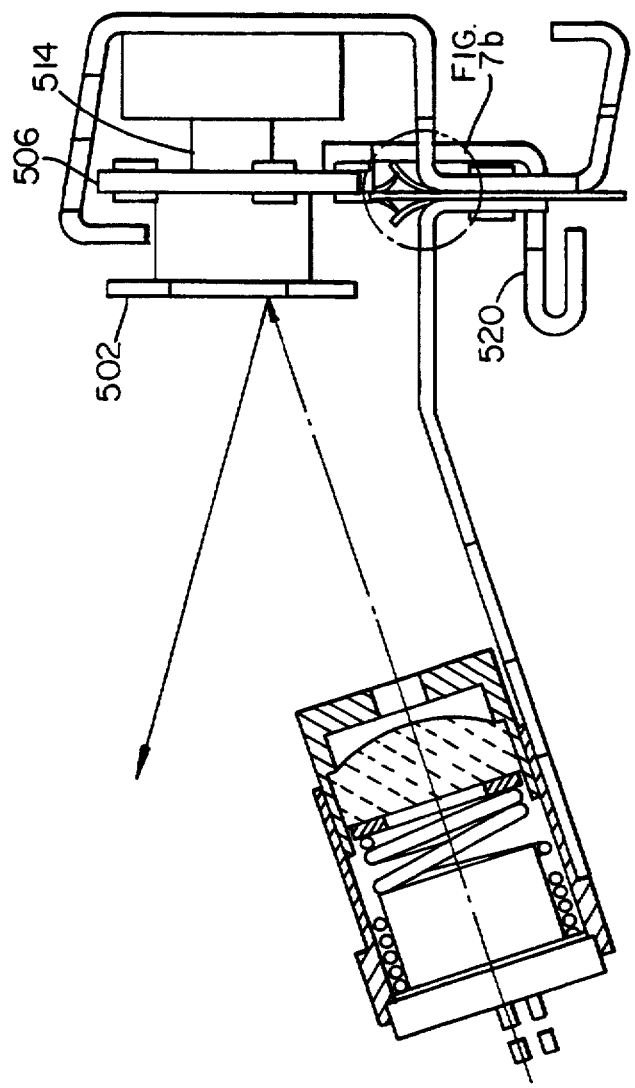
FIG. 7 depicts a two-dimensional beam scanning module incorporating a laser diode and focusing module and including the subassembly illustrated in FIGS. 3 and 4.

As shown in FIG. 7, the lower end of the Mylar TM or Kapton TM material sheet forming the planar spring 522 is fastened by means of suitable fasteners 526 and thereby clamped between a first support frame 528 and a second support frame 530. The support framed 528, 530 typically are formed of a non-magnetic metal, such as a beryllium-copper alloy. The second support frame 530 carries the electromagnet 516 at a position in close proximity to the permanent magnet 514. The first support frame carries the laser diode and focusing module 600.

Krichever et al., in their U.S. Pat. No. 4,923,281, disclose one example of a laser diode and optics module suitable for use as the module 600 in the present embodiment. Using the Krichever et al. implementation, the module 600 includes a gain guided type visible laser diode (VLD) 633, such as a TOLD9201.138 manufactured by Toshiba. A lens 635 focuses the beam from the laser diode 633, as necessary, to prepare the beam for transmission to the mirror 502. The module has two telescoping holding members 611 and 615, and a biasing spring 613 positioned between the laser diode 633 and the lens 635. One holding member 611 is attached to the laser diode 633, and the other member 615 holds the lens 635. The second holder 615 also provides an aperture 617 for the light passing through the lens 635.

Typically, the module 600 is assembled and focused prior to attachment thereof to the support frame 528. During actual focusing, the laser diode and focusing module assembly 600 is held in a jig which includes key or chuck elements to engage notches or keyways defining the orientation of the laser beam, lens and aperture as the two holding numbers 611 and 615 are gradually telescoped together. As soon as the desired focus is achieved, the two holders are permanently fixed relative to one another by using adhesives such as glue or epoxy, or by fastening such as by staking, spot-welding, ultrasonic welding, or the like.

A gain guided laser diode, such as the diode 633 is manufactured with a rectangular notch 621 in the base of the housing. The notch 621 defines the orientation of the laser diode chip within the diode housing. Specifically, with the housing positioned so that the notch corresponds to a vertical axis of the rear surface of the housing (bottom as shown in FIG. 7(a) or at the top), two of the three leads will lie along the horizontal axis. In such a position, the laser diode chip within the housing will also be aligned along the horizontal axis. The laser diode holder 611 will have a notch or keyway which may have the same orientation or may be positioned 90° around the circumference of the diode from the notch 621 in the base of the laser diode housing.

FIGS. 7 and 7(a) have been drafted on the assumption that the vertical axis through the laser diode housing is substantially perpendicular to the surface of the support member 528 on which the module 600 is mounted. As a result of this orientation, the gain guided VLD 633 is mounted so that the laser diode chip lies in a plane substantially perpendicular to the axis of vibration provided by vibration of the U-shaped spring 504 to produce the X-direction beam scanning motion. In the resultant scan pattern the beam width, measured parallel to the diode chip, will correspond in direction to the X-direction scanning motion. This orientation of the diode extends the working range of the two-dimensional scanner by using the astigmatism of the beam produced by this type of diode to compensate for decreasing line density at points further from the nose of the scanner, as will be discussed in more detail below with regard to FIGS. 11(A) to 16.

In the two-dimensional scanning module, the planar spring 522 is a first flexible strip supporting the various components for vibration about a substantially horizontal axis. The components supported by the spring 522 tend to be relatively massive. To provide relatively low frequency vibration, the material of the spring 522 has been chosen to be relatively flexible. As shown in enlarged detail in FIG. 7(b), additional flexible strips 542 and 544 on opposite sides of the planar spring 522 provide additional support and damping.

The additional flexible strips 542, 544 each consist of a Mylar TM or Kapton TM material sheet, similar to but shorter than the spring 522. The flexible strip 544 has a fixed lower end sandwiched between the first support frame 528 and the planar spring 522; and the flexible strip 542 has a fixed lower end sandwiched between the planar spring 522 and the second support frame 530.

The edge of the extension plate 517, carried by the planar spring 522, engages the flat surface of the flexible strip 544 near the free upper end of strip 544. Similarly, the edge of extension 518 engages the flat surface of the flexible strip 542 near the free upper end thereof. As seen by reference to FIG. 7(b), any movement of the free end of spring 522 to the right will cause extension 518 to push the free upper end of flexible strip 542 to the right, causing the strip 542 to bend further from its relaxed state. The flexible strip acts like a spring. As the strip 542 bends further, it creates a greater spring force opposing the motion which caused it to bend. As such, the flexible strip 542 will exert a force back through the extension 518 tending to oppose movement of the free end of the planar spring 522 to the right. Similarly, motion of the planar spring to the left will cause the flexible strip 544 to exert a spring force back through the extension 517 tending to oppose movement of the free end of the planar spring 522 to the left.

The spring forces provided by the flexible strips 542, 544 add physical support for the planar spring 522, and the friction between the extensions and the flexible strips tends to dampen the vibration of the spring 522. This construction prevents the weight of those components from causing the spring 522 to sag or droop and eliminates the jitter caused by vibration of the scanner housing, such as might be caused by hand movements of an operator holding the scanner. These advantages outweigh the cost of higher drive signal current needed to produce the necessary amplitude of the Y-direction scanning motion.

The extensions 517 and 518 flare out away from the planar spring 522. The end surface of each extension, where the extension contacts the corresponding flexible strip 542 or 544 (FIG. 7(b)), is polished to prevent damage to the surface of the flexible strips.

Figure 7B:
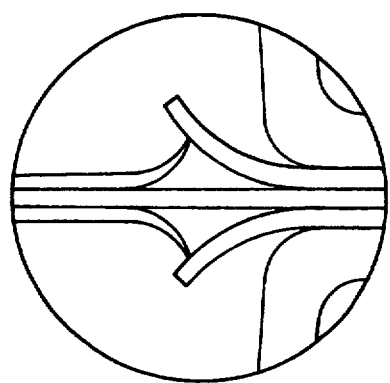
FIG. 7(b) is a detail view of a portion of the scanning module, indicated by the dashed circle 7b in FIG. 7, providing a further enlarged illustration of the support and damping provided for Y-dimensional motion by the additional flexible strips.
Figure 7A:
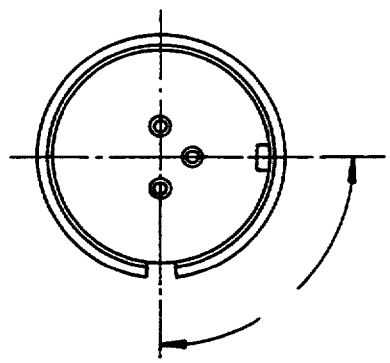
FIG. 7(a) is a rear view of the laser diode and focusing module incorporated in the scanning module of FIG. 7 for showing the orientation of the gain guided laser diode.

The radius of curvature of each of the extensions 517 and 518 is the same as the radius of curvature of the upper surface of the corners of the support frames 528 and 530 just above the areas where those frames clamp the flexible strips and the planar spring (see FIG. 7(b)). If the scanner receives a vertical shock, such as caused by dropping the scanner, the weight of the components supported by the planar spring 522 will exert a strong downward force on the spring 522 causing it to deform into an S-shape. For example, if impact forces the spring 522 to compress down and to the right in FIG. 7(b), the spring 522 will form an S-shape about the extension 517 and the upper curved surface of support frame 530. If instead the impact forces the spring 522 to compress down and to the left in FIG. 7(b), the spring 522 will form an S-shape about the extension 518 and the upper curved surface of support frame 528. The radii of the extensions 517, 518 and of the upper surface of corners of the support frames 528 and 530 limit the curvature of such S-shapes of the spring 522 which might result when the operator accidentally drops the scanner. For any planar spring of a given material and thickness, a minimum radius of curvature exists beyond which the spring can not bend without damaging the spring. Thus, if the planar spring 522 were to bend into a curved shape of a radius less than its minimum radius, the material of the planar spring would be permanently deformed. To prevent such damage, the radii of the extensions 517, 518 and the radii of the upper surface of corners of the support frames 528 and 530 are greater than the minimum radius for the Mylar TM or Kapton TM type planar spring 522.

When the subassembly 500 is incorporated into the scanner module 700, as shown in FIG. 7, the balance member 520 extends from the back of the L-shaped bracket which supports the plate 506 downward through a passage in the horizontal portion of the second support frame 530. The balance member 520 then bends to the left in the drawing and passes through openings in the vertical portions of the first and second support frames 528, 530. The lower end of the balance member 520 curves back to form a first stop. When the planar spring flexes so that the mirror pivots to the extreme left in the drawing, the curved stop at the lower end of the balance member 520 will impact on the lower portion of the second support frame 530. The balance member 520 and the second support frame 530 therefore establish a maximum limit for travel of the mirror in the direction to the left in FIG. 7. The plate 506 and electromagnet 516 serve as a second stop limiting motion in the opposite direction. When the planar spring 522 flexes so that the mirror moves to the extreme right in the drawing, the back surface of plate 506 will impact on the front surface of the electromagnet 516. The two stops limit the flexing of the planar spring 522 so that, if the scanner is dropped, the spring 522 will not flex to such an extreme degree as to damage the material thereof or damage any of the components of the scanner supported on the free end of the planar spring 522.

The unit 700 shown in FIG. 7 is modularly installable in the housing of a variety of scanners, one example of which is shown in FIG. 8. The exemplary bar code reader 1000 illustrated in FIG. 8 is implemented as a gun shaped device. Those components which correspond to components shown in FIG. 1 have been labeled with corresponding reference numerals.

Figure 1:
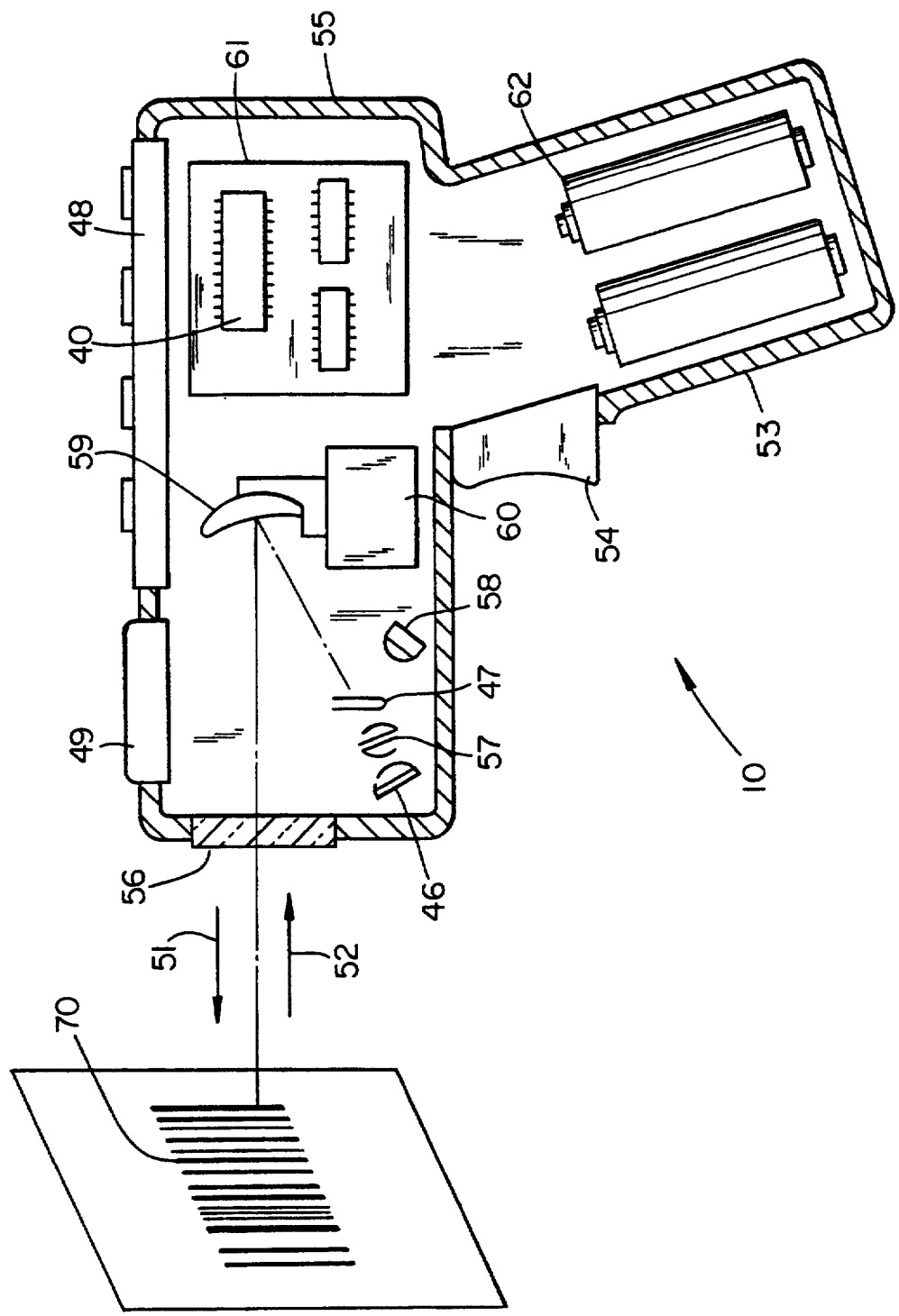
FIG. 1 is a cross-sectional illustration of a prior art bar code reader unit implemented as a gun shaped device.

The device 1000 comprises a lightweight plastic housing 55 having a pistol-grip type of handle 53. The housing 55 contains the photodetector 58 oriented to receive reflected light 52 directly through window 56, the signal processing circuitry and the CPU 40, as well as the power source or batteries 62. The light-transmissive window 56 in the front end of the housing 55 also allows the outgoing light beam 51 to exit for scanning across the two-dimensional bar code 1070. The device 1000, like the device illustrated in FIG. 1, is designed to be aimed at a bar code symbol by the user from a position in which the reader 1000 is spaced from the symbol 1070, i.e., not touching the symbol or moving across the symbol.

As further depicted in FIG. 8, the laser diode and focusing module 600 produces a light beam which is reflected from the oscillating mirror 502. The mirror 502 is driven by magnet 514 and coil 516 to oscillate in two orthogonal directions when the coil is energized in response to actuation of the trigger 54.

The two dimensional bar code 1070 comprises a series of lines of optically encoded information. As shown, the lines are oriented in the X-direction, shown substantially horizontal, and are located one above another in the Y-direction (vertical). The widths of the dark regions, the bars, and/or the widths of the light spaces between the bars indicate the encoded information on each line. To read the two-dimensional indicia 1070, the reader 1000 scans the indicia with a raster-type scan pattern or the like, produced by the two dimensional motion of the mirror 502.

As in the FIG. 2 embodiment, the electromagnet 516 in the embodiment of FIG. 7 typically comprises a core or bobbin around which a coil is wound. When there is no current through the coil, the resilient nature of the U-shaped spring 504 and the planar spring 522 causes the mirror 502 to return to its rest position. When a current is introduced through the coil, interaction between magnetic fields of the coil and the permanent magnet 514 creates a moment of force moving the magnet 514 away from its equilibrium position. This force moment moves the permanent magnet 514 either toward or away from the bobbin and coil of the electromagnet 516. As a result of such motion, a spring force is produced by the planar spring 522 which tends to bring the permanent magnet 514 back to the rest position. Reversing the polarity of the applied current will reverse the directions of the magnetic force and the opposing spring force. Therefore, if the current applied to the coil of the electromagnet 516 takes the form of a cyclical AC signal, such as a sign wave, a pulse signal, a triangular wave, etc., the induced magnetic forces will produce an oscillatory movement or vibration of the permanent magnet 514.

As discussed above, the U-shaped spring 504 and the planar spring 522 have been designed to vibrate in two different frequency ranges. A drive signal applied to the coil of electromagnet 516 comprises two different cyclical signal components of different frequencies. The first signal component has a frequency within the high range of frequencies corresponding to the vibration frequency of the U-shaped spring 504. The second signal component has a frequency within the low range of frequencies corresponding to the vibration frequency of the planar 522. Thus the vibratory magnetic forces applied to the permanent magnet 514 will include two different frequency components corresponding to the two component signals in the drive signal. Because of the different frequency vibration characteristics of the two springs 504 and 522, each spring will vibrate only at its natural vibration frequency. Thus when the electromagnet 516 is driven by such a superposition signal, the U-shaped spring 504 will vibrate at a frequency in the high range of frequencies, and the planar spring 522 will vibrate at a frequency in the low range of frequencies.

Returning to FIG. 8, the oscillation of the mirror 502 in the two orthogonal directions at the two different frequencies causes the reflected beam 51 to scan back and forth in the X-direction and up and down in the Y-direction in a raster pattern across the surface on which the two-dimensional bar code 1070 appears. The light 52 reflected back by the symbol 70 passes back through the window 56 for application to the detector 58. The detector 58 produces an analog signal proportional to the intensity of the reflected light 52. This signal is processed and digitized by circuitry mounted on board 61 and decoded by microprocessor 40. To scan a symbol 1070, a user aims the bar code reader unit 1000 and operates movable trigger switch 54 to activate the light beam 51, the coil 516 and the detector circuitry.

Other Scanner Embodiments Using Additional Flexible Strips

Figure 9:
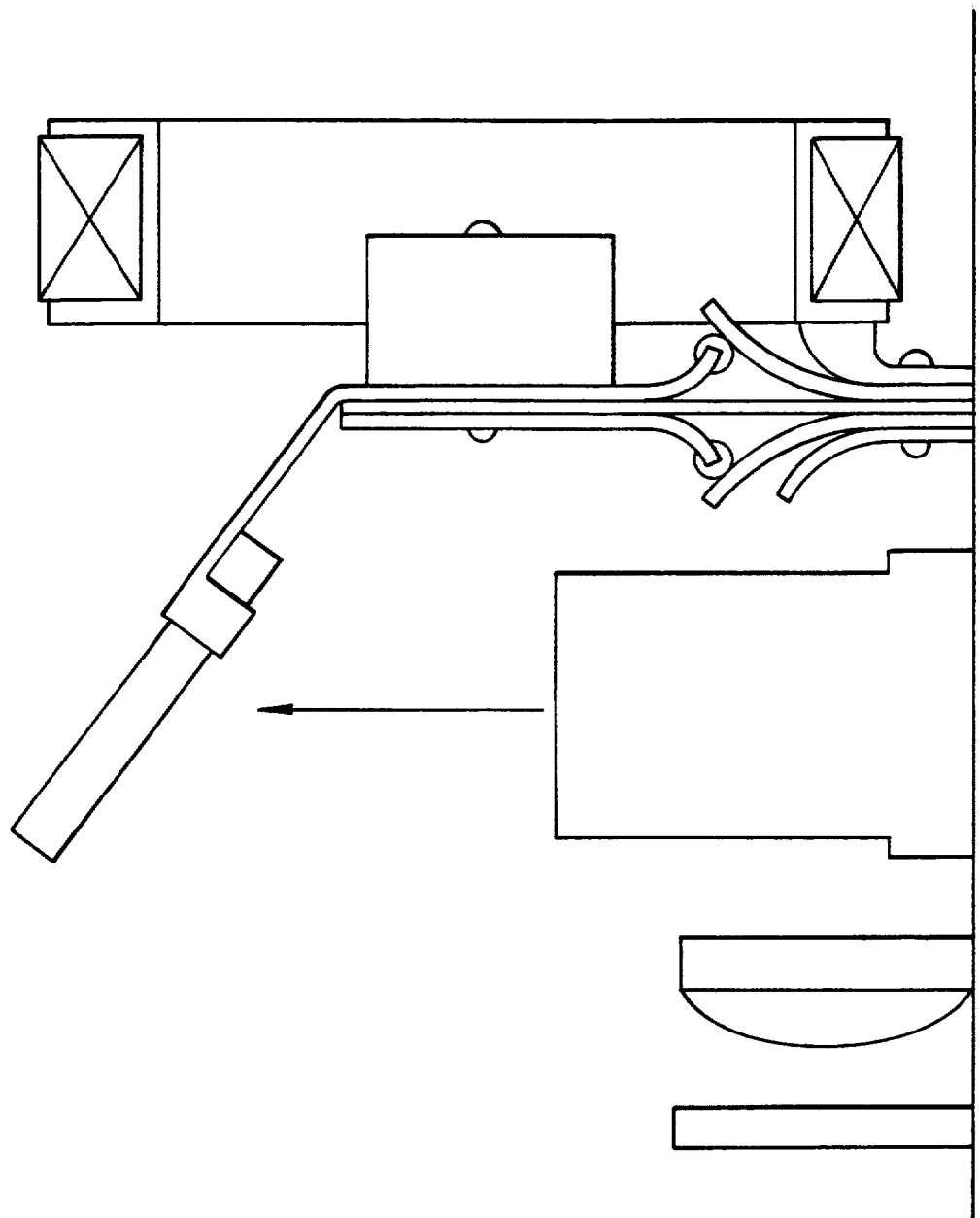
FIGS. 9 and 10 depict one-dimensional scanner embodiments incorporating variations of the damping of the optical component motion in accord with the present invention.

FIG. 9 illustrates a one-dimensional scanner module 800 incorporating a second embodiment of the means for damping the optical component motion in accord with the present invention. A bent plate 806 supports the mirror 802 and the permanent magnet 814. The mirror 802 has an expanded portion and a rectangular neck portion essentially the same as did the mirror 502 in the previous embodiment (see e.g. FIG. 5). Inwardly folded clip-like members or gripping arms 812 formed at opposite side edges of plate 806 clamp the rectangular neck portion of the mirror 802. A rivet or pin or similar fastener passes through the magnet 814, the support plate 806, the planar spring 822 and a front plate 806'. As a result, the magnet 814 is attached to the back surface of the plate 806; and the upper free end of the planar spring 822 is clamped between the plates 806 and 806'.

Second flexible strips 842 and 844 are provided on opposite sides of the planar spring 822. The lower fixed ends of the Mylar TM or Kapton TM material sheets forming the planar spring 822 and the flexible strips 842, 844 are fastened by means of suitable fasteners 826 so as to be clamped between a first support frame 828 and a second support frame 830. The second support frame 830 carries the bobbin and coil of the electromagnet 816. The first and second support frames are attached to a base shown only as a solid line at the bottom of the drawing. If the scanner 800 should provide a vertical beam scanning motion, the base is horizontal as shown in the drawing. If the scanner 800 should provide a horizontal beam scanning motions the base would be held vertically (as if FIG. 9 is a top view).

The lower end of the plates 806 and 806' curve out away from the planar spring 822 to form a pair of extensions 817 and 818. The end of each extension 817, 818 carries a plastic cylinder 817', 818'. Typically, the cylinders 817' and 818' are formed of a plastic material, such as Mylar TM or Kapton TM, which is essentially similar to the material of the flexible strips 822, 842 and 844.

The cylinder 817' at the end of the extension plate 817 engages the flat surface of the flexible strip 844 near its free upper end. Similarly, the cylinder 818' at the end of the extension 818 engages the flat surface of the flexible strip 842 near its free upper end. The cylinders 817' and 818' prevent possible scarring of the flat surface of the strips 842, 844 by edges of the extensions which would increase friction between the extensions and the flexible strips.

The permanent magnet 814 projects into the opening in the center of the electromagnet 816. Application of a cyclical drive signal to the coil of the electromagnet 816 will produce an alternating magnetic force on the permanent magnet 814 and the components attached thereto. The resultant push-pull force causes the permanent magnet and attached components to reciprocate back and forth about the pivot axis formed by the planar spring 822. The spring 822 and the flexible strips 842, 844 produce spring forces tending to restore the magnet 814, the mirror 802 and the spring 822 to their rest positions shown in FIG. 9. The support frames 828 and 830 curve in such a manner that the upper portions thereof limit the flexing motion of the spring 822 and the flexible strips 842, 844.

Movement of the free end of spring 822 to the right will cause extension 818 and cylinder 818' to push the free upper end of flexible strip 842 to the right, causing the strip 842 to bend further from its relaxed state. The flexible strip acts like a spring. As the strip 842 bends further, it creates a greater spring force opposing the motion which caused it to bend. As such, the flexible strip 842 will exert a force back through the extension 818 tending to oppose movement of the free end of the planar spring 822 to the right. Similarly, motion of the planar spring to the left will cause the flexible strip 844 to exert a spring force back through the extension 816 tending to oppose movement of the free end of the planar spring 822 to the left.

When the laser diode and focusing module 600 emits a light beam, the moving mirror 502 reflects the beam toward a target surface on which an indicia appears. The reciprocal vibration of the mirror 502 causes the beam to scan a line to the left of the module 800 shown in the drawing. If module 800 is oriented vertically, as shown, the resultant scan line would be vertical and in essentially the same plane as the drawing figure. The light reflected back by the indicia passes back through an ambient light blocking optical filter 856 for application to the detector 58. The detector 58 produces an analog signal proportional to the intensity of the reflected light which is processed, digitized and decoded in the usual manner.

The spring forces provided by the flexible strips 842, 844 add physical support for the planar spring 822, and friction between the cylinders and the flexible strips 842, 844 tends to dampen the vibration of the spring 822 in a manner similar to that of the earlier embodiment. This construction prevents the weight of the mirror from causing the spring 822 to sag or droop and eliminates the jitter caused by vibration of the scanner housing, such as might be caused by hand movements of an operator holding the scanner.

Figure 10:
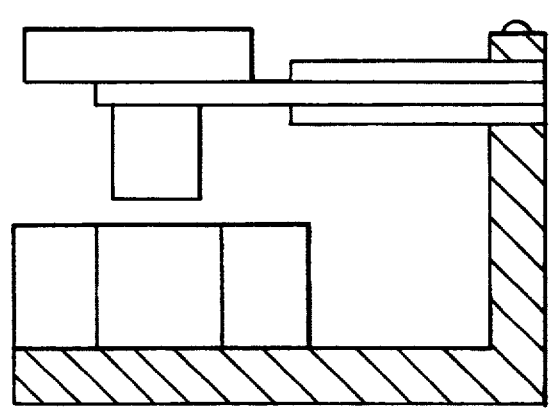

FIG. 10 illustrates the flexible support structure, mirror and magnets of another one-dimensional scanner 900 incorporating a third embodiment of the means for damping the optical component motion in accord with the present invention. A mirror 902 and a permanent magnet 914 are attached directly to opposite surfaces of the planar spring 922, for example by gluing the mirror 902 and the magnet 914 to the spring near the upper end of the spring.

Second flexible strips 942 and 944 are provided on opposite sides of the planar spring 922. The lower fixed ends of the Mylar TM or Mylar TM material sheets forming the planar spring 922 and the flexible strips 942, 944 are clamped between a support frame 928 and an end plate 930 by one or more suitable fasteners. The support frame 928 carries the bobbin and coil of an electromagnet 916 in close proximity to the permanent magnet 914.

The flat surface of the planar spring 922 on the side on which mirror 902 is mounted frictionally engages the adjacent flat surface of the flexible strip 942. Similarly, the flat surface of the planar spring 922 on which magnet 914 is mounted frictionally engages the flat surface of the flexible strip 944.

Application of a cyclical drive signal to the coil of the electromagnet 916 will produce an alternating magnetic force on the permanent magnet 914 and the components attached thereto. The resultant push-pull force causes the permanent magnet and attached components to reciprocate back and forth about the pivot axis formed by the planar spring 922. The spring 922 and the flexible strips 942, 944 produce spring forces tending to restore the magnet 914, the mirror 902 and the spring 922 to their rest positions shown in FIG. 10.

Movement of the free end of spring 922 to the right will cause the free upper ends of the spring 922 and the flexible strip 942 to deform to the right. The spring 922 and the flexible strip produce a combined spring force opposing such motion which increases at points further to the right. Similarly, motion of the planar spring 922 to the left will cause the spring 922 and the flexible strip 944 to deform to the left. The spring 922 and the flexible strip produce a combined spring force opposing such motion which increases at points further to the left.

When a beam of light from a laser diode and focusing module (not shown) impacts on the moving mirror 502, the mirror reflects the beam toward a target surface on which an indicia appears. The reciprocal vibration of the mirror 502 causes the beam to scan a line to the right of the module 900 shown in the drawing. For example, if module 900 is oriented vertically, as shown, the resultant scan line would be vertical and in essentially the same plane as the drawing figure. A detector (not shown) senses the light reflected back by the indicia, and the analog signal from the detector is processed, digitized and decoded in the usual manner.

The spring forces provided by the flexible strips 942, 944 add physical support for the planar spring 922, and friction between the flexible strips 922, 944 and surfaces of spring 922 tends to dampen the vibration of the spring 922. This construction prevents the weight of the components supported by the spring from causing the spring 922 to sag or droop and eliminates the jitter caused by vibration of the scanner housing, such as might be caused by hand movements of an operator holding the scanner.

Extension of Working Range of Two-Dimensional Scanner

The gain-guided VLD is the simplest and most common laser source used in optical scanners. The gain-guided laser diode, however, emits a beam with a large astigmatism. More specifically, the beam cross section varies in size and orientation at different distances from the scanner.

If a first dimension of the beam cross-section is defined as $X'$, parallel to the plane of the laser diode chip, then the second dimension $Y'$ is defined as perpendicular to the plane of the laser diode chip. As shown by the graph in FIG. 11(A), the width of the beam in the $X'$ dimension is smaller than the height of the beam in the $Y'$ direction, at points close to the scanner. As a result, the beam cross-section has an elongated oval shape and tends to be vertically oriented at such points. At a beam waist point (narrowest point of the beam), the width and height in the two dimensions are substantially equal, and the beam cross-section becomes circular. At points further away, beyond the beam waist, the width of the beam in the $X'$ dimension is larger than the height of the beam in the $Y'$ direction. As a result, the beam cross-section has an elongated oval shape and tends to be horizontally oriented at such distant points.

As noted above in the discussion of FIG. 7(a), the notch 621 was positioned to orient of the laser diode chip within the housing of laser diode 633 so that the laser diode chip lies in a plane substantially perpendicular to the axis of vibration provided by vibration of the U-shaped spring 504 which produces the X-direction beam scanning motion. As a result, the $X'$ dimension of the beam corresponds to the X-scanning motion produced by flexing of the U-shaped spring 504. Thus, the laser beam is oscillated such that the cross-sectional width of the beam moves in a direction substantially corresponding to the direction of the lines of the indicia.

An optimum scanning device for two-dimensional systems provides best focus (smaller spot size) at some distance from the scanning head. The working range for such a device then extends from a point between the scanner and the best focus point to a point at a distance beyond the best focus point. For beams having the noted astigmatism; at ranges between the scanner and the focal position the elliptical long axis of the beam is vertical while at larger distances it is horizontal. The fast scanning is done in the horizontal direction. Precisely how this compensates for decreasing scan line density at points further from the scanner will be explained below. Moreover, scanning in the direction of the long elliptical axis makes the beam more visible, making aiming of the scanner at the indicia easier for the human operator because at distant points laser power is distributed over a larger scan pattern.

The following analysis assumes for discussion purposes that the scanner 1000 produces 750 X scans/sec with a homogenous (linear) X line distribution along Y, and the scanner should provide a 0.5 sec decode time. The maximum spillover of scan lines between rows or lines of the indicia should be 10%. Also, 4 good attempts per row are needed for a robust decode within the 0.5 sec design limit. For discussion purposes, we will also assume that the scan angle parameters of scanner 1000 are $\theta_x = \pm 14°$ and $\theta_y = \pm 7.5°$.

For this example, assume that the two-dimensional indicia is 1" high in the Y direction and is 1.5" wide in the X direction. If the code is positioned 4" from the mirror (2" from the nose of the scanner), the scan pattern height is also 1". As a result, all scan lines of the scanning pattern cross the indicia (FIG. 11(C)). In any given scan pattern having a beam cross-section of a certain height, some of the scan lines will overlap adjacent rows of the two-dimensional indicia. The detector signal produced by such scan lines will not accurately represent the variations of light reflectivity of any actual row of the indica. At points close to the scanner, however, because of the large number of lines crossing the indicia, enough lines will cross only each row of the indicia to produce a valid read of the indicia in the allotted time.

If the code is positioned 8" from the mirror (6" from the nose of the scanner), the scan pattern is higher than the indicia and a smaller number of scan lines fall across the indicia. Because of the beam astigmatism, however, the height of the beam is shorter (FIG. 11(A)). As a result, fewer scan lines will overlap adjacent rows of the indicia. Conversely, although fewer scan lines cross the indicia because of the lower density, a larger percentage of those lines will produce a valid read of only a single row of the indicia.

FIG. 11(C) shows the Y scan of the 1"×1.5" indicia. If the code is positioned 4" from the mirror, the scan pattern width is only slightly larger than the width of the code. If the code is positioned 8" from the mirror, the scan pattern widens so that a substantial portion at the end of each scan line falls outside the boundaries of the indicia.

Assuming a scanner can decode X dimension bar and space symbols using a 1.5" $X'$ spot width, it has been found that the working range (WR) for a 10 Mil code is from 3" to 8" distance from the mirror (FIG. 11(A)). At the near end of the working range, however, the pattern size is the limiting factor. Thus, only at 4" away from mirror (2" from nose) where we have 2"×1" pattern big enough for a 1.5"×1" two-dimensional bar code (FIG. 11(B)).

Figure 12B:
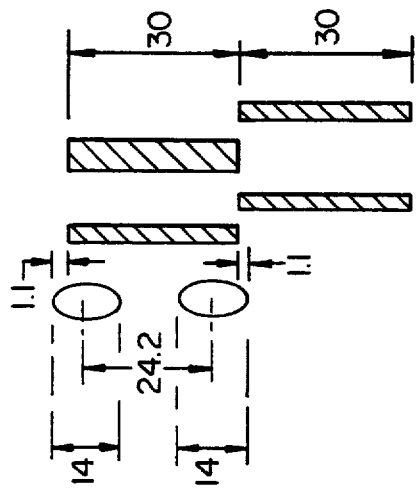
FIGS. 12(a) to 12(c) illustrate scanning of rows of a two-dimensional bar code.
Figure 12C:
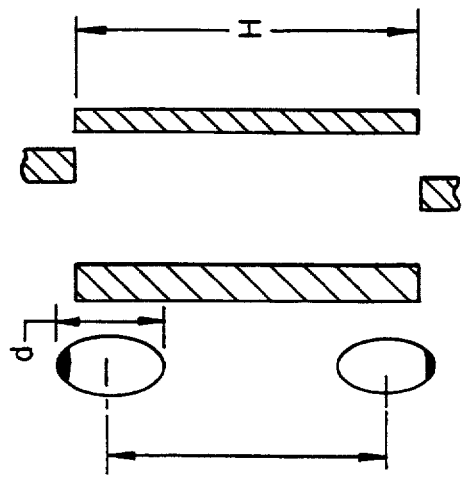

FIG. 12(C) illustrates the relationship of a laser beam spot passing along different scan lines, as the spot crosses over a portion of a two-dimensional bar-code. The bar code in the drawing has a row height H, which in our example is 30 Mil. The spot has a height (in the Y-scan direction) of d. The spots shown in FIG. 12(C) correspond to lines at the maximum positions which will allow accurate reading of the bar code row, i.e. spillover of 10% of the spot onto the next higher or lower row of code (indicated in the drawing by shading of the overlapping portion of the spots). The distance between the centers of spots at such maximum positions is indicated by the variable m.

The spot shapes shown in FIG. 12(C) correspond to scanning of an indicia with an astigmatic beam oriented in accord with the present invention, where the code is positioned at the near end of the working range of the scanner (4" from the mirror). Specifically, the spots are oval in shape and oriented so that the long access of the oval is aligned in the Y-scanning direction. If the indicia is a 30 Mil bar code, as in the above example, then the distance m between the centers of spots at the illustrated maximum positions would be 19.6 Mil.

At 4", performance is not substantially reduced. In 0.5 seconds there will be 375 scans, Y=13 mils and 30 mil row height. Since 10% spillover is acceptable, we have (2.6+(30−13))/30=65% probability for a good scan (see FIG. 12(c)). Thus, we have 244 good scans with 33 rows or 7.4 scans/row (we have assumed linear distribution of X scan lines along Y integrated during 0.5 sec).

At the far end of the working range, the density of scan lines is the limiting factor. FIG. 12(b) illustrates spot scanning of an indicia with an astigmatic beam oriented in accord with the present invention, where the code is positioned at the far end of the working range of the scanner (8" from the mirror). Specifically, the spots are oval in shape and oriented so that the short access of the oval is aligned in the Y-scanning direction. If the indicia is a 30 Mil bar code, as in the above example, then the distance m between the centers of spots at the positions illustrated in FIG. 12(b) would be 21.2 Mil. At 8", the Y' dimension d is 11 mil, thus the probability is (2.2+30−11)/30=70% for a good scan (see FIG. 13(b)). The pattern is 2" high so for the 1" high barcode there will be 187.5 scans per 0.5 sec for 33 rows. This results in 4 good attempts/row. Thus, in the example specified above, the Y' spot size is smaller and even at 8" this label can be read.

Figure 12A:
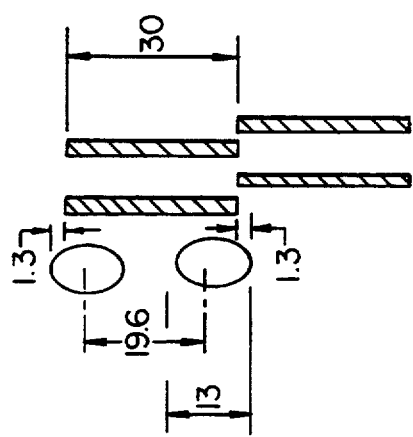

For comparison, consider a beam having a circular spot size throughout, i.e. wherein Y spot behavior is the same as that for X. FIG. 12(a) illustrates spot scanning of an indicia with a circular beam, when the code is positioned at the far end of the working range of the scanner. If the indicia is a 30 Mil bar code, then the distance m between the centers of spots at the positions illustrated in FIG. 12(a) would be 19.6 Mil. The far end of the working range is at 7.5" since X' spot width d at that point is 13 mil. Thus, there will be a probability of (2.6+(30−13))/30=65% for a good scan. The pattern size, however, is 1.9" at this location, so there are only 197 scans through the 33 rows of the code. This gives 3.9 good attempts/row (see FIG. 12(a)).

From the above discussion, it should be clear for the example stated that the working range for a scanner using a gain-guided laser diode oriented as taught by the present invention, the working range is 4" (between 4" and 8" from the mirror of the scanner or between 2" and 6" from the nose of the scanner). In contrast, the use of a circular spot beam, without astigmatism, would produce only a 3.5" working range (between 4" and 7.5" from the mirror of the scanner or between 2" and 5.5" from the nose of the scanner). Thus the disclosed diode orientation effectively increases the working range from 3.5" (circular spot) to 4". A gain guided laser at the wrong orientation would produce an even shorter working range. The invention achieves the increase in working range by using astigmatic spot size because:

a) At the far end density is the limiting factor. The invention did not change density at this end, increased the probability for a good scan at this end by using lower Y spot size.

b) At the near end, although astigmatism would cause a bigger Y spot size in the range from 3.5"–4", pattern size, not spot size, is the limiting factor. The near end limit of the working range therefore remains unchanged.

From the above detailed description, it should now be clear that the present invention provides improved support and vibration damping for scanners using planar flexible springs to support moving scanner components. The invention also extends the working range of two-dimensional scanners by use of a precisely oriented gain-guided laser diode.

We claim:

1. An optical scanning system for reading optically encoded indicia having portions of differing light reflectivity, said system comprising:

emitting and optics means for emitting a beam of light and optically directing the beam of light toward the optically encoded indicia;

means for receiving light reflected back from the optically encoded indicia and producing electrical signals corresponding to the differing light reflectivity of the optically encoded indicia;

a first flexible strip, one end of which is fixed, and an opposite end of which is free to move upon flexing of said first flexible strip;

means for producing a reciprocal flexing motion of the first flexible strip such that the free end of the first flexible strip reciprocates;

means for mounting a component of the emitting and optics means for reciprocal movement with the free end of the first flexible strip, such that the light beam scans across the optically encoded indicia during the reciprocal flexing motion of the first flexible strip;

a second flexible strip having a fixed end and a free end; and engagement means for engaging a portion of the second flexible strip at least at or near the free end of the second flexible strip during the reciprocal flexing motion of the first flexible strip, such that said second flexible strip provides support for said first flexible strip or frictionally dampens the reciprocal flexing motion of the first flexible strip.

2. A system as in claim 1, wherein the means for producing a reciprocal flexing motion of the first flexible strip comprises first and second magnets one of which is a permanent magnet and the other of which is an electromagnet to which an alternating drive signal is applied, the first magnet being mounted in a fixed relationship with respect to the free end of the first flexible strip for reciprocal motion together therewith, and the second magnet being positioned in proximity to the first magnet, such that application of the alternating drive signal to the electromagnet produces a magnetic field which acts on the permanent magnet to produce reciprocal movement of the free end of the first flexible strip and the component of the emitting and optics means.

3. A system as in claim 1, wherein the second flexible strip has one end fixed at a point adjacent to the fixed end of the first flexible strip, and the engagement means comprises a surface of the first flexible strip in frictional engagement with a surface of the second flexible strip.

4. A system as in claim 1, wherein the engagement means comprises an extension member, mounted in a fixed relationship with respect to the free end of the first flexible strip for movement therewith, said extension member pushing against the second flexible strip when the free end of the first flexible strip flexes in a first direction such that the second flexible strip produces a spring force opposing the flexing of said first flexible strip in said first direction.

5. A system as in claim 4, further comprising a cylinder formed at an end of the extension member such that the cylinder contacts the second flexible strip at or near the free end thereof.

6. A system as in claim 5, wherein the second flexible strip and the cylinder both consist of a plastic material.

7. A system as in claim 1, wherein the second flexible strip comprises two flexible strips positioned on opposite sides of the first flexible strip.

8. A system as in claim 7, wherein the engagement means comprise opposing surfaces of the first flexible strip which each frictionally engage a surface of one of the two second flexible strips.

9. A system as in claim 7, wherein the engagement means comprises a pair of extension members, mounted in a fixed relationship with respect to the free end of the first flexible strip for movement therewith, said extension members pushing against the two second flexible strips during the reciprocal flexing motion of the first flexible strip, such that the two flexible strips produce spring forces opposing the flexing motion of said first flexible strip.

10. A system as in claim 9, further comprising two cylinders, each of which is formed at an end of one of the extension members, such that each cylinder contacts one of the two second flexible strips at or near the free end thereof.

11. A system as in claim 10, wherein the second flexible strips and the cylinders each consist of a plastic material.

12. A system as in claim 9, wherein each extension member curves to a polished end surface which contacts a flat surface of one of the second flexible strips at or near the free end thereof.

13. A system as in claim 12, wherein the radius of the curve of each extension member is sufficiently large that deformation of the first flexible strip around the curve of either extension member will not damage the first flexible strip.

14. A system as in claim 9, wherein each extension member is formed of a beryllium-copper alloy or similar flexible metal.

15. A system as in claim 1, wherein the emitting and optics means comprises means for generating a laser beam.

16. A system as in claim 15, wherein the emitting and optics means further comprises a mirror, said mirror constituting the component of the emitting and optics means which is mounted for movement with the free end of the first flexible strip.

17. A system as in claim 16, wherein the emitting and optics means further comprises means for vibrating the mirror in a direction substantially orthogonal to the reciprocal flexing motion of the first flexible strip.

18. A system as in claim 1, wherein the first flexible strip consists of a plastic material.

19. A two-dimensional optical scanning system for reading indicia optically encoded in two dimensions, said indicia having portions of differing light reflectivity, said system comprising:

emitting and optics means for emitting a beam of light and optically directing the beam of light toward the optically encoded indicia;

first support means for mounting a component of the emitting and optics means for oscillating movement in a first direction at a first oscillating frequency;

second support means for mounting the first support means for oscillating movement in a second direction at a second oscillating frequency, said second direction being substantially orthogonal to said first direction, and said second frequency being less than said first frequency, wherein said second support means comprises:

(i) a first flexible strip one end of which is fixed and an opposite end of which is free to reciprocate in the second direction upon reciprocal flexing of said first flexible strip, (i) means for supporting the first support means for reciprocal movement together with the reciprocal movement of the free end of the first flexible strip in the second direction, (iii) a second flexible strip having a fixed end and a free end, and (iv) engagement means for engaging a portion of the second flexible strip at least at or near the free end of the second flexible strip during the reciprocal flexing motion of the first flexible strip, such that the second flexible strip provides support for the first flexible strip or frictionally dampens the reciprocal flexing motion of the first flexible strip;

read-drive means for simultaneously producing reciprocal motion of the optical component mounted on the first reciprocal support means in the first direction and reciprocal motion of the free end of the first flexible member in the second direction, such that the beam of light implements a two-dimensional scanning pattern across a surface on which said optically encoded indicia appears; and means for receiving light reflected back from the surface and producing electrical signals corresponding to the differing light reflectivity of the optically encoded indicia.

20. A two-dimensional optical scanning system as in claim 19, wherein:

the second flexible strip has its fixed end attached at a point adjacent to the fixed end of the first flexible strip, and the engagement means comprises a surface of the first flexible strip in frictional engagement with a surface of the second flexible strip.

21. A two-dimensional optical scanning system as in claim 19, wherein the second flexible strip comprises two flexible strips positioned on opposite sides of the first flexible strip.

22. A two-dimensional optical scanning system as in claim 21, wherein the engagement means comprises opposing surfaces of the first flexible strip which each frictionally engage a surface of one of the two second flexible strips.

23. A two-dimensional optical scanning system as in claim 21, wherein the engagement means comprises a pair of extension members, mounted in a fixed relationship with respect to the free end of the first flexible strip, said extension members pushing against the two second flexible strips during the reciprocal flexing motion of the first flexible strip, such that the two flexible strips produce spring forces opposing the flexing motion of said first flexible strip.

24. A two-dimensional optical scanning system as in claim 23, further comprising two cylinders, each of which is formed at an end of one of the extension members, such that each cylinder contacts one of the two second flexible strips at or near the free end thereof.

25. A two-dimensional optical scanning system as in claim 24, wherein the second flexible strips and the cylinders each consist of a plastic material.

26. A two-dimensional optical scanning system as in claim 23, wherein each extension member curves to a polished end surface which engages a flat surface of one of the second flexible strips at or near the free end thereof.

27. A two-dimensional optical scanning system as in claim 26, wherein the radius of the curve of each extension is sufficiently large that deformation of the first flexible strip around the curve of either extension will not damage the first flexible strip.

28. A two-dimensional optical scanning system as in claim 23, wherein each extension member is formed of a beryllium-copper alloy or similar flexible metal.

29. A two-dimensional optical scanning system as in claim 19, wherein the emitting and optics means comprises means for generating a laser beam.

30. A two-dimensional optical scanning system as in claim 29, wherein the emitting and optics means further comprises a mirror, the mirror constituting said component of the emitting and optics means.

31. A two-dimensional optical scanning system as in claim 29, wherein the means for generating a laser beam comprises a gain guided laser diode oriented such that the plane of the diode is substantially parallel to said first direction.

32. A two-dimensional optical scanning system as in claim 19, wherein:
the read-drive means comprises first and second magnets one of which is a permanent magnet and the other of which is an electromagnet to which a drive signal is applied,
the first magnet is mounted in a fixed relationship with respect to the free end of the first flexible strip for reciprocal motion together therewith, and
the second magnet is mounted at a stationary point in close proximity to the first magnet.

33. A two-dimensional optical scanning system as in claim 32, wherein:
said first reciprocal support means is configured to vibrate at a high range of frequencies and said second reciprocal support means is configured to vibrate at low range of frequencies, and
the drive signal applied to the electromagnet comprises a superposition of a first signal component having a frequency within said high range of frequencies and a second signal component having a frequency within said low range of frequencies.

* * * * *